(12) United States Patent
Moore (10) Patent No.: US 10,185,843 B2
(45) Date of Patent: *Jan. 22, 2019

(54) PUBLIC VIEWING SECURITY

(71) Applicant: SONY INTERACTIVE ENTERTAINMENT AMERICA LLC, San Mateo, CA (US)

(72) Inventor: Shawn Moore, San Diego, CA (US)

(73) Assignee: SONY INTERACTIVE ENTERTAINMENT AMERICA LLC, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/814,381

(22) Filed: Nov. 15, 2017

(65) Prior Publication Data

US 2018/0089472 A1 Mar. 29, 2018

Related U.S. Application Data

(63) Continuation of application No. 14/060,461, filed on Oct. 22, 2013, now Pat. No. 9,824,241.

(51) Int. Cl.
*G06F 21/84* (2013.01)

(52) U.S. Cl.
CPC ........ *G06F 21/84* (2013.01); *G06F 2221/032* (2013.01)

(58) Field of Classification Search
USPC .......... 726/26, 2, 21, 36; 713/150, 163, 181; 380/255, 264, 276
See application file for complete search history.

(56) References Cited

U.S. PATENT DOCUMENTS 9,367,677 B1* 6/2016 Adhami ................. G06F 21/32
9,794,260 B2* 10/2017 Loughlin-McHugh ...................... H04L 63/10

(Continued)

FOREIGN PATENT DOCUMENTS

CN 101625716 1/2010
CN 102096419 6/2011

(Continued)

OTHER PUBLICATIONS

Kemmerer et al., "Intrusion Detection: A Brief History and Overview"., Reliable Software Group, Computer Science Department, University of California Santa Barbara. Security & Privacy—2002 retrieved on [Nov. 24, 2014]. Retrieved from: <URL: https://www.cs.ucsb.edu/~vigna/publications/2002_Kemmerer_vigna_IntrusionDetection.pdf>.

(Continued)

*Primary Examiner* — Sharif E Ullah
(74) *Attorney, Agent, or Firm* — Polsinelli LLP (57) ABSTRACT

Methods and systems for activating a display security application and initiating a privacy measure on a computing device are provided. A user opens and turns on an application on the computing device, which monitors the security of the screen. The security feature recognizes when an unauthorized user is within viewing range of the display of the computing device. The user is prompted to initiate a privacy measure or ignore the unauthorized user. If the user initiates the privacy measure, the unauthorized user is prevented from seeing the content on the display. The user may terminate the privacy measure when the unauthorized user is no longer within viewing range of the display.

15 Claims, 10 Drawing Sheets

(56) References Cited

U.S. PATENT DOCUMENTS

| | | | | |
|---|---|---|---|---|
| 9,824,241 | B2* | 11/2017 | Moore | G06F 21/84 |
| 2009/0141895 | A1* | 6/2009 | Anderson | G06F 21/84 |
| | | | | 380/252 |
| 2010/0205667 | A1* | 8/2010 | Anderson | G06F 3/013 |
| | | | | 726/19 |
| 2011/0116017 | A1* | 5/2011 | Gere | G02F 1/1323 |
| | | | | 349/73 |
| 2013/0254874 | A1* | 9/2013 | Xu | G06F 21/32 |
| | | | | 726/17 |
| 2013/0336547 | A1* | 12/2013 | Komogortsev | A61B 5/1171 |
| | | | | 382/117 |
| 2015/0113657 | A1* | 4/2015 | Moore | G06F 21/84 |
| | | | | 726/26 |
| 2015/0138059 | A1* | 5/2015 | Large | G02F 1/1323 |
| | | | | 345/102 |

FOREIGN PATENT DOCUMENTS

| | | |
|---|---|---|
| CN | 104715213 | 6/2015 |
| JP | 2013-190608 | 9/2013 |
| TW | 201342113 | 10/2013 |
| TW | 201520826 | 6/2015 |
| WO | WO 2015/060988 | 4/2015 |

OTHER PUBLICATIONS

Suman et al., "A Scanner Darkly: Protecting User Privacy From Perceptual Applications"., May 19, 2013. The University of Texas at Austin, Princeton University. Retrieved on [Nov. 26, 2014]. Retrieved from: <URL: https://www.cs.utexas.edu/~shmat/shmat_oak13darkly.pdf>.
Chinese Patent Application No. 201410569322.8 First Office Action dated Jun. 5, 2017.
Taiwanese Patent Application No. 103136534 Office Action dated Mar. 10, 2017.
PCT Application No. PCT/US2014/057538 International Search Report and Written Opinion dated Jan. 2, 2015.
U.S. Appl. No. 14/060,461 Office Action dated Jan. 10, 2017.
U.S. Appl. No. 14/060,461 Final Office Action dated Dec. 15, 2015.
U.S. Appl. No. 14/060,461 Office Action dated Jul. 28, 2015.
Chinese Patent Application No. 201410569322.8 Second Office Action dated Feb. 13, 2018.
Chinese Patent Application No. 201410569322.8 Third Office Action dated Jun. 20, 2018.

* cited by examiner

100

Prompt user to open application
105

Prompt user to select start-up option
110

Prompt user to select preferences
115

Receive user selections
120

Store user selections
125

Activate display security monitoring
130

PUBLIC VIEWING SECURITY

CROSS-REFERENCE TO RELATED APPLICATIONS

The present application is a continuation and claims the priority benefit of U.S. patent application Ser. No. 14/060,461 filed Oct. 22, 20130, now U.S. Pat. No. 9,824,241, and entitled "Public Viewing Security for Public Computer Users", the disclosure of which is incorporated herein by reference.

BACKGROUND OF THE INVENTION

Field of the Invention

This invention generally relates to displays, and more particularly to providing security measures for portable computing device displays.

Description of the Related Art

Due to the increase in the availability of portable computing devices such as laptops, tablets, and mobile devices, work that used to be performed solely on desktop computers can now be performed in almost any place at almost any time. Users of portable devices often find themselves utilizing their devices in public settings such as airplanes, coffee shops, and libraries. The user of such devices is often performing work or viewing content that is confidential or that the user otherwise does not otherwise wish to share with persons the people around them in public spaces.

One solution to this problem is monitor filter screens, which are also known as privacy screens. Such screens are physical accessories that are physically coupled to portable device displays. These screens filter out light reflected from displays and decrease the viewing angle of the display. This allows the user some degree of privacy by preventing the contents of the display from being viewed from certain angles to the sides of the display. The screens are typically made from polycarbonate, acrylic, or mesh. A drawback to these screens—mesh screens, in particular—is that they degrade the image quality of the contents on the display.

Privacy screens suffer a number of other drawbacks as well. For example, in some instances, while the user who is sitting in front of the display can see the screen, people sitting next to the user, affiliated with the user, and working concurrently on a certain document or discussing a particular piece of content cannot see the same. Further, such screens do not prevent people who are walking by or sitting behind the user from viewing the content of the display on the portable device. Thus, privacy can be obviated by an unauthorized user simply repositioning themselves.

Therefore, there is a need for improved security and privacy for displays on portable devices used in public.

SUMMARY OF THE CLAIMED INVENTION

Embodiments of the present invention provide for activating a display security monitoring application on a computing device. A user is prompted to open a display security monitoring application on the computing device. The user is prompted to select an option to start using the display security monitoring application, and may optionally select preferences regarding the operation of application. The selections are stored in memory and the application begins to monitor the security of the display.

Various embodiments of the present invention include methods for initiating a privacy measure. Such methods may include recognizing an unauthorized user within viewing range of a display of a computing device. The authorized user is prompted to initiate a privacy mode. The privacy mode is initiated by triggering a privacy measure. The security feature recognizes when the unauthorized user is no longer within viewing range of the display and notifies the authorized user. The authorized user is prompted to terminate the privacy mode, and the privacy measure is deactivated.

Further embodiments include systems for activating a display security feature and initiating a privacy measure. Such systems may include a memory and a computing device with a display. The display includes a camera that can detect faces and/or retinas of humans. A processor executes instructions stored in memory, wherein execution of the instructions by the processor to activate the display security monitoring and initiate a privacy measure to prevent unauthorized users from viewing content on the display.

Some embodiments of the present invention further include computer-readable storage media having embodied thereon programs executable by processors to perform methods for activating a security feature and initiating a privacy feature.

DETAILED DESCRIPTION

Figure 1:
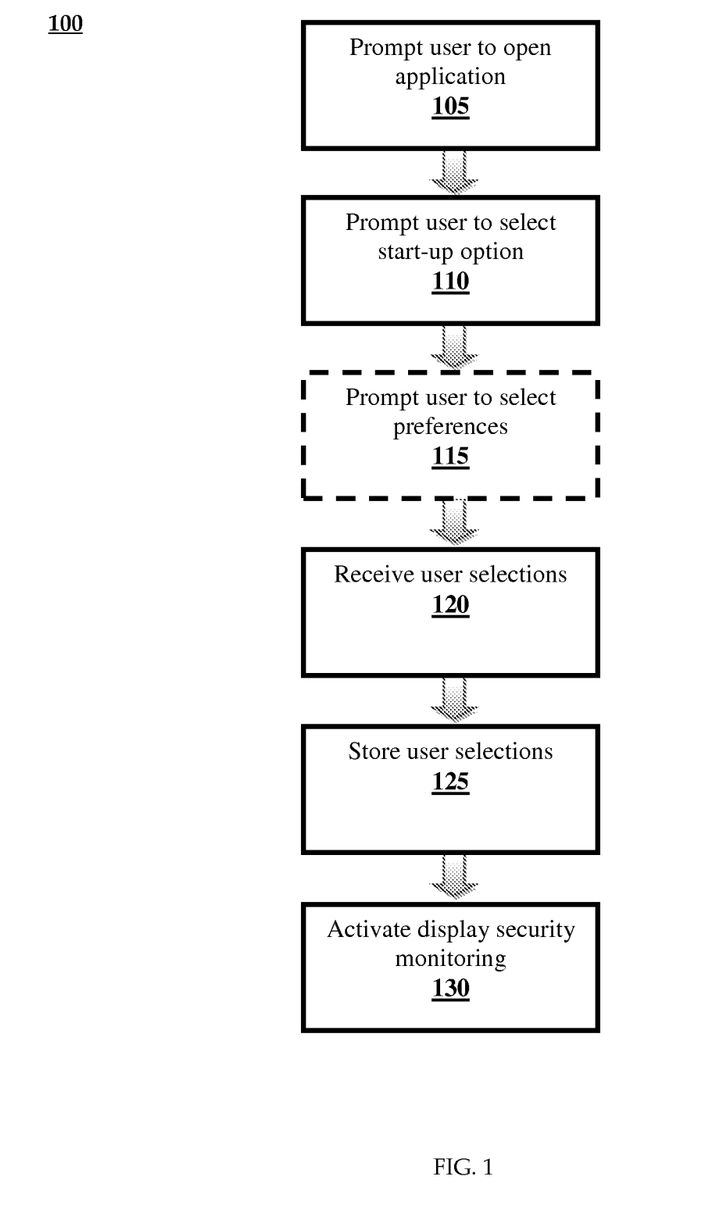
FIG. 1 illustrates a method for activating a display security monitoring application.

Embodiments of the present invention provide a system and method for utilizing a display security feature for public viewing on a portable device. FIG. 1 illustrates a method for activating a display security monitoring application. The steps identified in FIG. 1 (and the order thereof) are exemplary and may include various alternatives, equivalents, or derivations thereof including but not limited to the order of execution of the same. The steps of the method of FIG. 1 (and its various alternatives) may be embodied in hardware or software including a non-transitory computer-readable storage medium (e.g., an optical disc or memory card) having instructions executable by a processor of a computing device.

A display security feature may be implemented by one or more processors that execute instructions stored in memory mediums. The executed code may result in the processor(s) generating one or more graphical interfaces.

Referring now to FIG. 1, illustrates a method for activating a display security monitoring application 100 is illustrated. A user is prompted to open a display security monitoring application 305 (FIG. 3A) in a computing device, such as a laptop, at step 105. In step 110, the user is prompted to select an option to start using a display security feature on the computing device by activating an start button 310 (FIG. 3B).

Optionally, the user may also be prompted to select preferences with regard to the operation of the display security feature at step 115. Preferences regarding the type of display security feature may include a screen saver, a power down function, a blocked screen area, or an active shutter three-dimensional function. Preferences regarding initiation of the display security feature may include automatic initiation or initiation only after the user is prompted to initiate the feature. Preferences regarding termination of the display security feature may include automatic termination or termination after the user is prompted to terminate the feature (See FIG. 3C).

Figure 5:
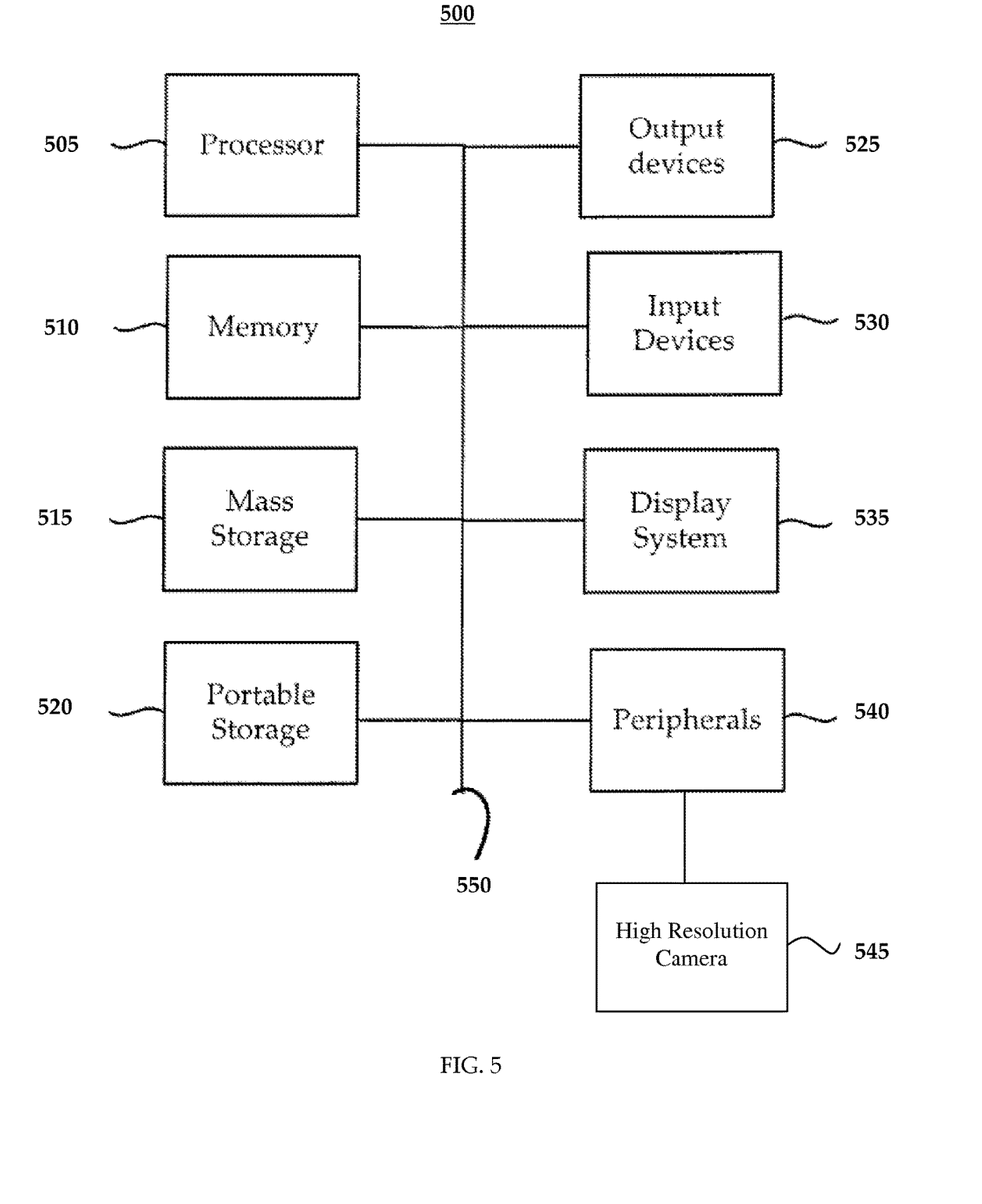
FIG. 5 illustrates a computing system that may be used to implement the various methodologies disclosed herein.

In step 120, the user selection(s) (e.g., the selection to start using the display security feature and/or user preference selection) are received and stored in memory 510 (FIG. 5). In step 130, the user turns on display security monitoring using the stored preferences by activating an "on" or similar button 340 (FIG. 3D).

Figure 2:
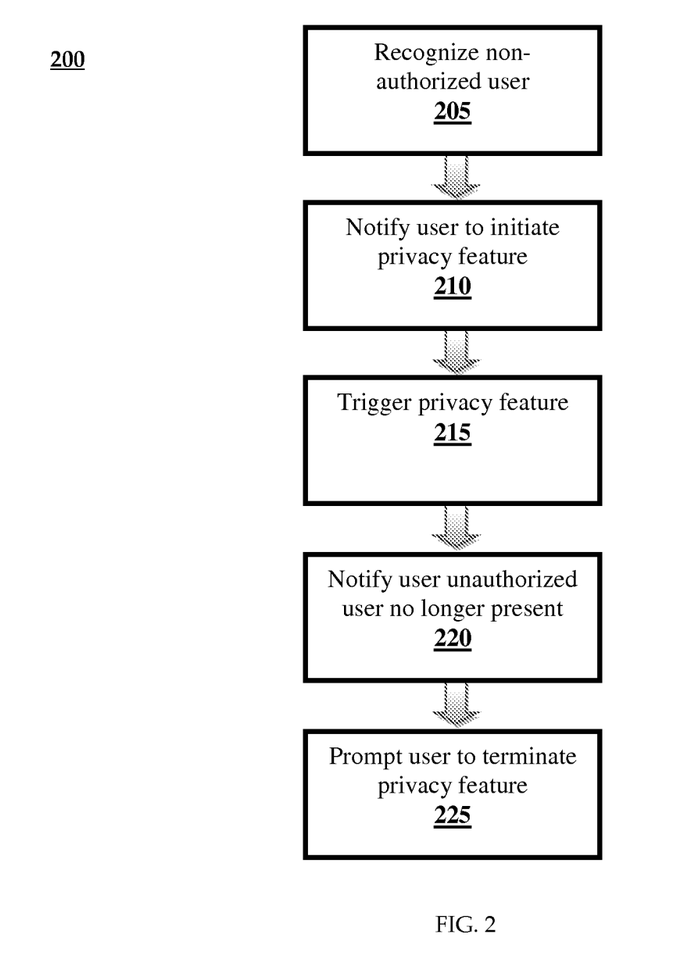
FIG. 2 illustrates a method for initiating a privacy measure.

Referring now to FIG. 2, a method for initiating a privacy measure 200 is illustrated. At step 205, an integrated tracking camera of the computing device recognizes, for example, a face or a set of eyes that does not belong to the user associated with the computing device. In typical tracking cameras, infrared non-collimated light is reflected from the eye and sensed by an optical sensor. The information is then analyzed to extract eye rotation from changes in reflections. Camera-based trackers focus on one or both eyes and records their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer may be needed before using the tracking camera.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most tracking cameras use a sampling rate of at least 30 Hz, although 50/60 Hz is most common. Some tracking cameras run as high as 1250 Hz, which is needed to capture detail of very rapid eye movement.

A range camera may instead be used with the present invention to capture gestures made by the user and is capable of facial recognition. A range camera is typically used to capture and interpret specific gestures. This technology may use an infrared projector, a camera, a depth sensor, and a microchip to track the movement of objects and individuals in three dimension. This system employs a variant of image-based three-dimensional reconstruction.

Alternatively, the integrated tracking camera may utilize a charge coupled device (CCD) or a complementary metal oxide semiconductor (CMOS). Both CCDs and CMOSs are commonly used image sensors that convert light into electronic signals. The electric signals are converted into a digital value, allowing the camera to detect an object in the field of view.

At step 210, the user selects a choice with regard to a privacy mode. The user may choose to initiate the privacy mode, thereby triggering a privacy measure at step 215. A privacy measure may include blocking portions of the screen where the non-authorized user is within viewing range, initiating a screen saver, or another privacy measure. Alternatively, the user may choose to ignore the non-authorized user and, therefore, not trigger the privacy measure. For example, the user may choose to forego initiating of the privacy measure when the user knows the non-authorized user and/or is not concerned about the privacy of the content on the screen (e.g., the user is using the computing device for entertainment, such as playing a game or watching a movie) (See FIGS. 4A-4B).

At step 220 the user is notified (e.g., by a screen prompt on a computing device) that the non-authorized user is no longer detected when the integrated tracking camera recognizes that the set of eyes or face is no longer within viewing range of the display. At step 225, the user may be prompted choose to turn the privacy measure off because the security threat is no longer present (See FIG. 4C).

Thus, according to an embodiment of the present invention, the user is notified of potential security threats and is given control over when a privacy measure is activated to protect the security of the content displayed on the computing device.

FIGS. 3A-3D illustrate interfaces for the method of initiating privacy monitoring 100 (FIG. 1).

Figure 3A:
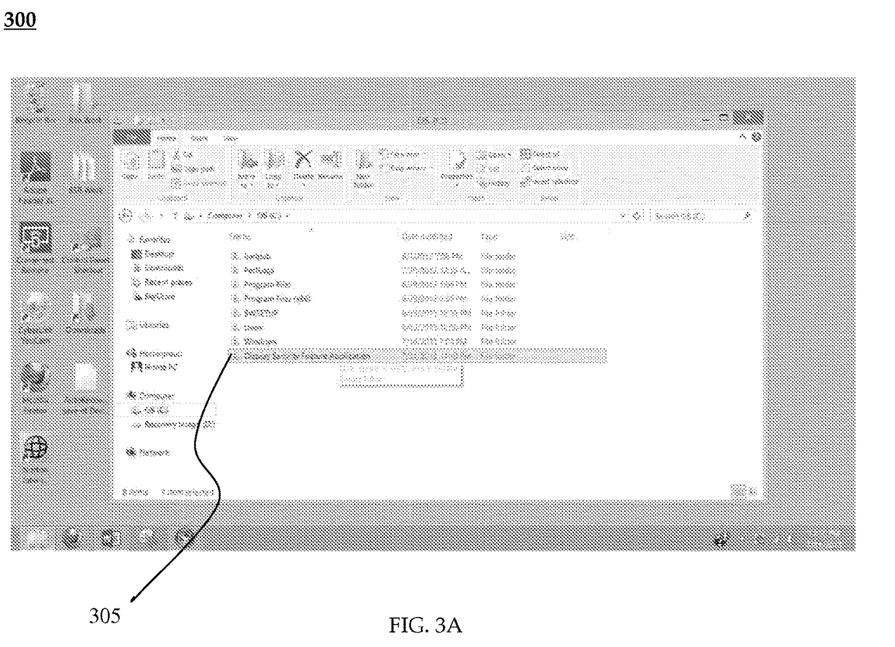
FIG. 3A illustrates a graphical interface for opening a display security monitoring application.
Figure 3B:
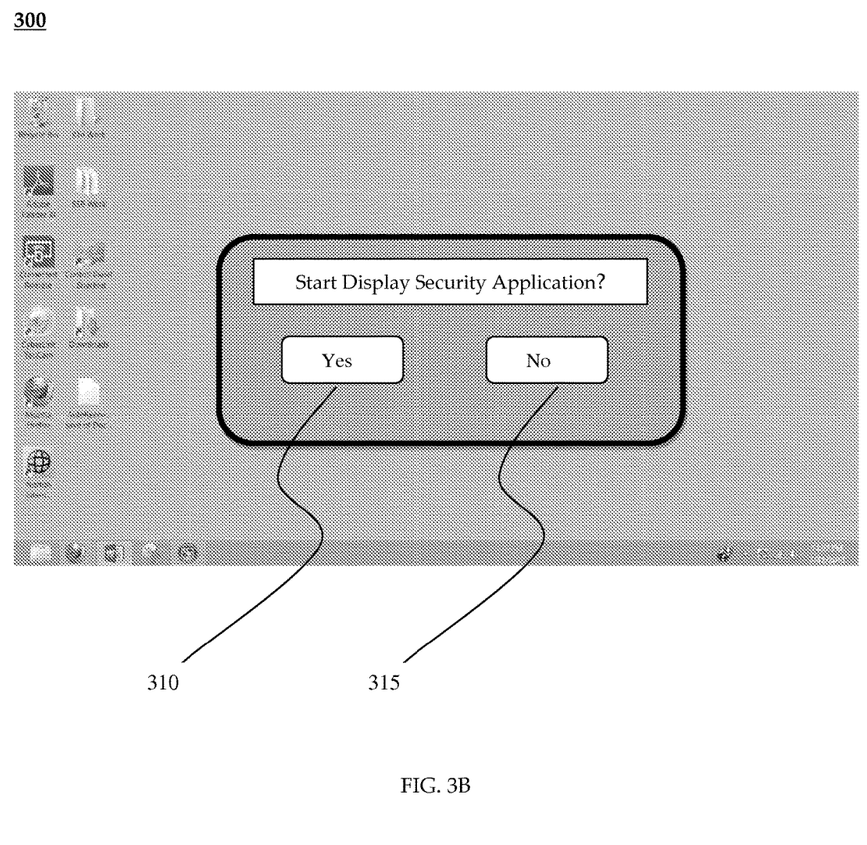
FIG. 3B illustrates a graphical interface for selecting an option to start using a display security monitoring application.

Referring now to FIG. 3A, a graphical interface for opening a display security feature application is illustrated. A user may select to open a display security feature on a computing device by, for example, selecting the application 305 from a list of applications on the computing device, as described in step 110 (FIG. 1).

Referring now to FIG. 3B, a graphical interface for selecting an option to start using a display security feature is illustrated. After a user selects the application 305 shown in FIG. 3A, a user may be prompted to select an option to start using a display security feature, using button "YES" 310 or button "NO" 315.

Figure 3C:
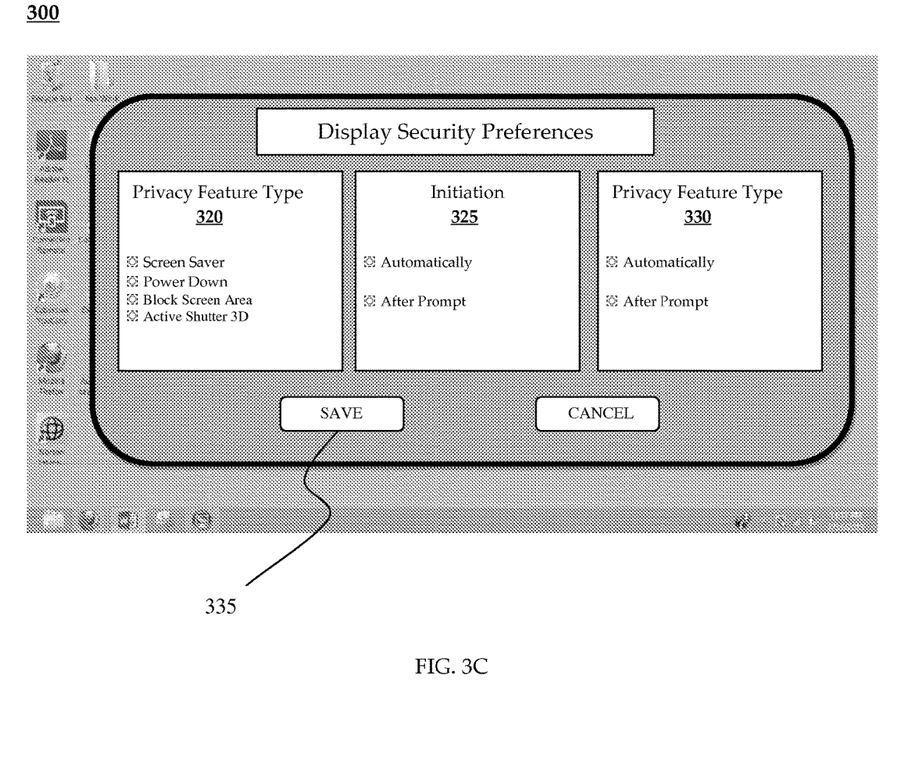
FIG. 3C illustrates a graphical interface for selecting and saving preferences regarding the operation of the display security monitoring application.
Figure 3D:
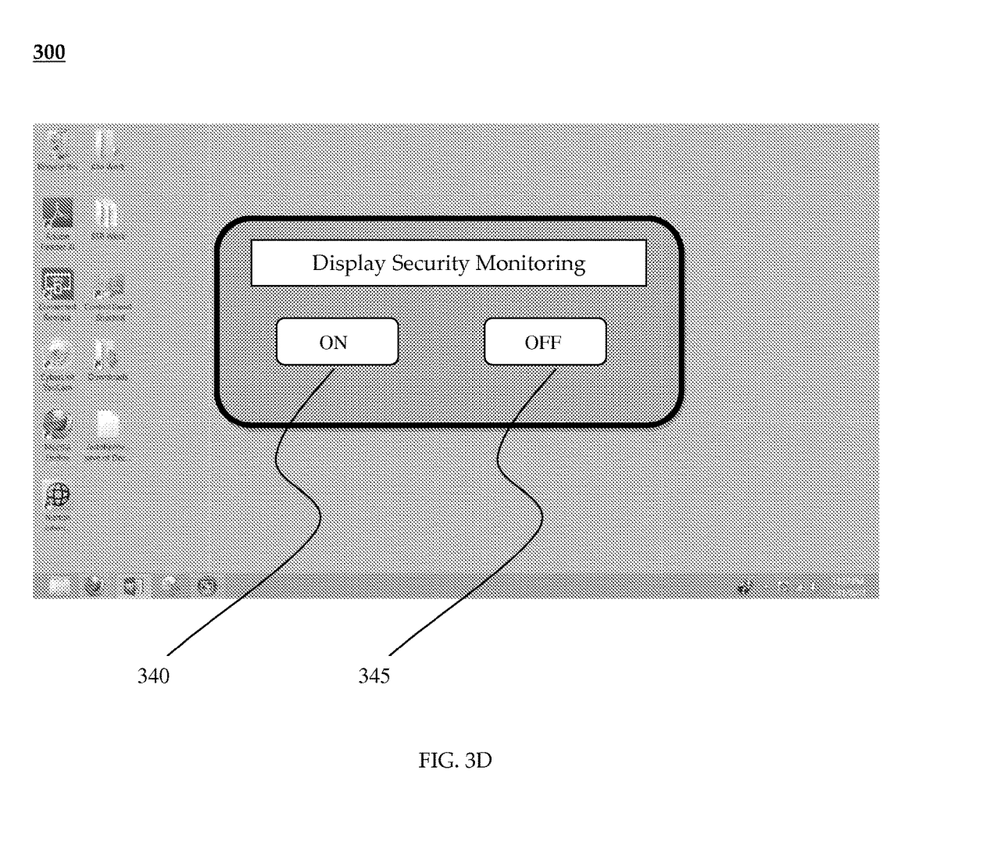
FIG. 3D illustrates a graphical interface for selecting an option to turn on display security monitoring.

Referring now to FIG. 3C, a graphical interface for selecting and saving preferences regarding the operation of the display security feature is illustrated. When the user selects the "YES" button 310 shown in FIG. 3B, a user may be prompted to select preferences with regard to the operation of the display security feature, as described in step 115 (FIG. 1).

The available preferences may include, for example, the type of privacy measure 320, such as a screen saver, powering down the device, blocking a portion of the screen from viewing, or implementing an active shutter 3D system. An active shutter 3D system (alternatively known as an alternate frame sequencing, alternate image, AI, alternating field, field sequential, or eclipse method) is a method of displaying stereoscopic three-dimensional (3D) images. An image is presented that is intended to be viewed only by the left eye while blocking the view of the right eye. The right eye is then presented with an image intended to be viewed only by the right eye while blocking the view of the left eye. These steps are repeated rapidly, such that the interruptions do not interfere with the perceived fusion of the two images into a single 3D image. Active shutter 3D systems generally require the use of liquid crystal (LC) shutter classes (also known as LCS glasses, LCS 3D classes, LC shutter glasses, or active shutter glasses). The glasses are controlled by a timing signal that allows the glasses to alternately block one eye and then the other, in synchronization with the refresh rate of the screen.

The display security preferences may also include preferences regarding initiation of the privacy measure 325, as described more fully below in FIG. 2. The privacy measure may be initiated automatically or only upon the selection of a prompt by the user. For example, a user may wish to utilize the automatic initialization feature when he is away from his computing device so that the display is protected from unauthorized viewers in his absence.

The display security preferences may also include preferences regarding termination of the privacy measure 330, as described more fully below in FIG. 2. The privacy measure may be terminated when the threat is no longer present or only upon selection of a prompt by the user. A user may be prompted to save the preferences regarding the display security feature by choosing button "SAVE" 335, as described in steps 120 and 125 (FIG. 1).

Referring now to FIG. 3D, a graphical interface for selecting an option to turn on display security monitoring. After a user selects and saves preferences in FIG. 3C, a user may be prompted to select an option to turn on display security monitoring using button "ON" 340 or button "OFF" 345.

Figure 4A:
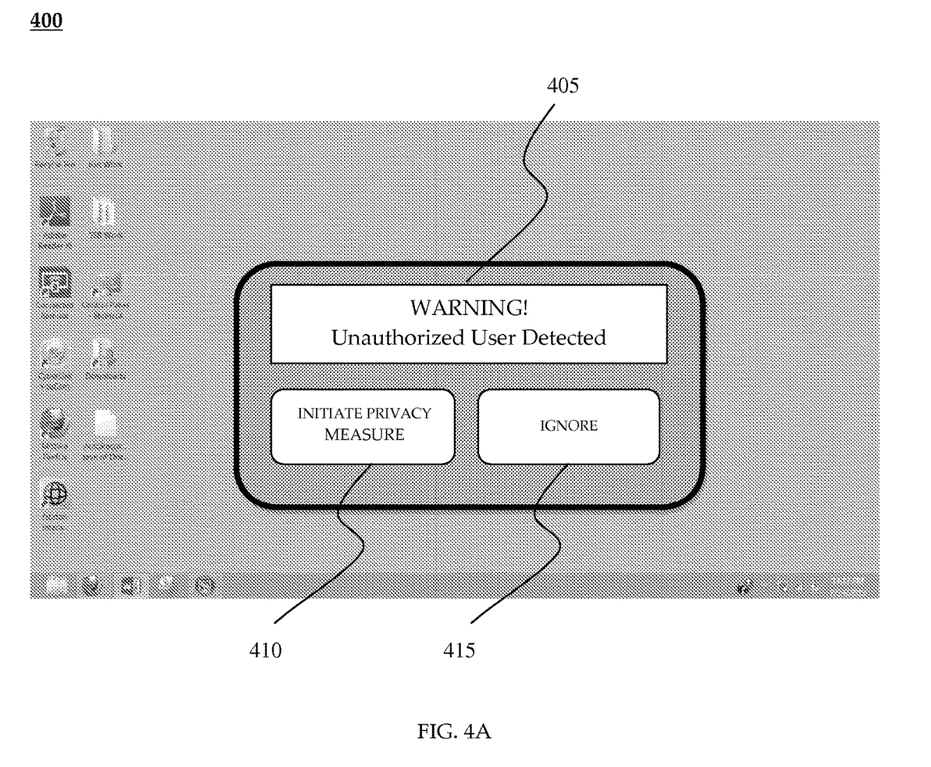
FIG. 4A illustrates a graphical interface for sending a notification regarding the detection of an unauthorized viewer.
Figure 4B:
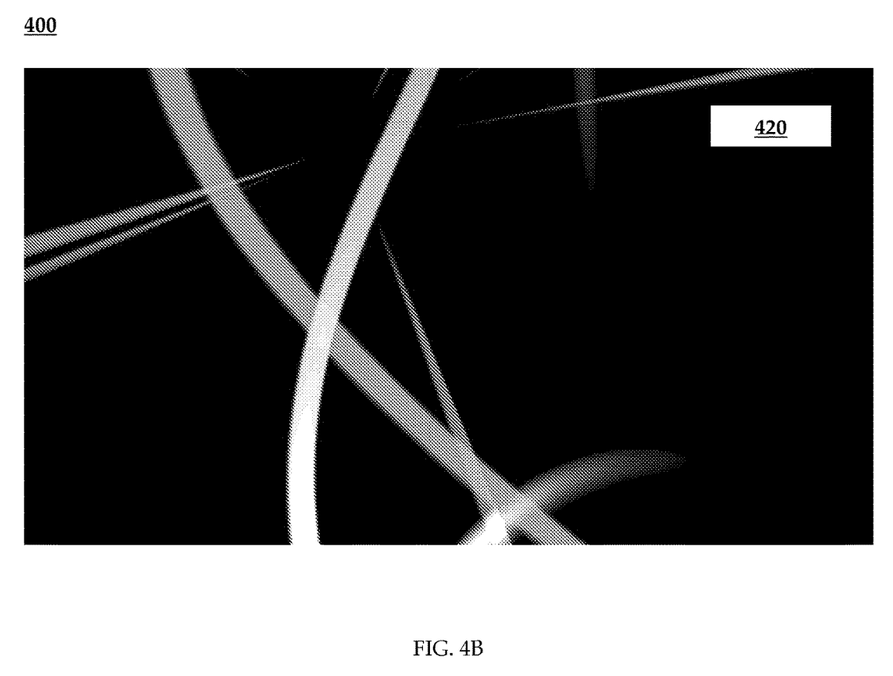
FIG. 4B illustrates a graphical interface for triggering a privacy measure.
Figure 4C:
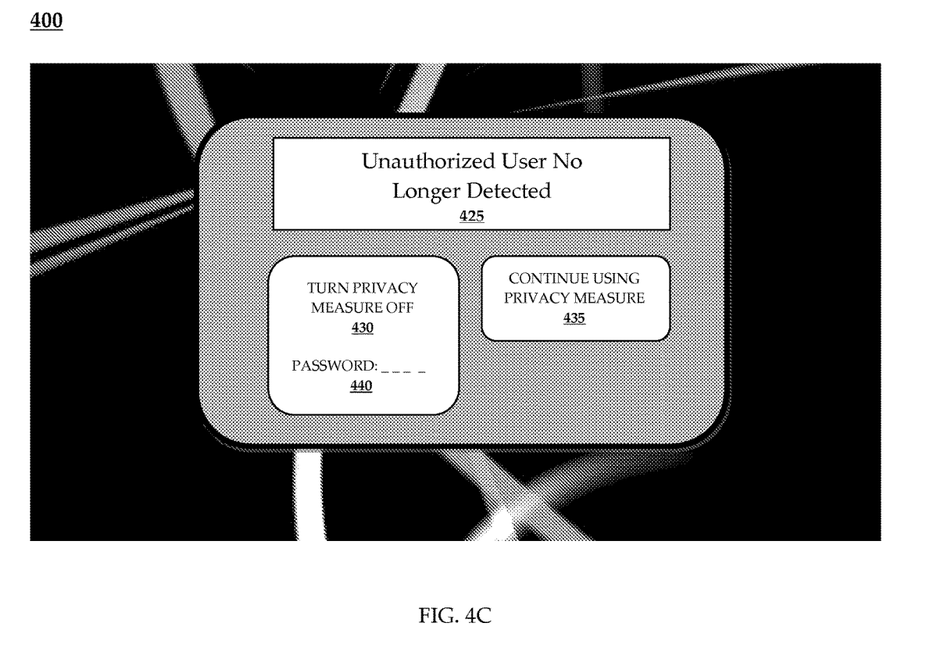
FIG. 4C illustrates a graphical interface for notifying a user that an unauthorized viewer is no longer detected.

FIGS. 4A-4C illustrate interfaces for the method for initiating a privacy measure 200 (FIG. 2) when the display security monitoring has been turned on (FIGS. 1 and 3).

Referring now to FIG. 4A, a graphical interface for sending a notification regarding the detection of an unauthorized viewer is illustrated. A user is notified via a prompt 405 on the computing device that an unauthorized user has been detected within viewing range of the display of the computing device, as described in step 205 (FIG. 2). The user may select button "INITIATE PRIVACY MEASURE" 410, which triggers the privacy feature as described in step 215 (FIG. 2).

Alternatively, the user may select button "IGNORE" 415, in which case the privacy measure will not be initiated and the user may continue to use the computing device. However, other viewers within the field of view may be able to see the display of the computing device. Thus, the contents on the display may not be secure.

Referring now to FIG. 4B, a graphical interface for triggering a privacy measure is illustrated. If the user chooses to initiate the privacy measure by selecting button 410 (FIG. 4A), a privacy measure 420 is triggered, as described in step 215 (FIG. 2).

Referring now to FIG. 4C, a graphical interface for notifying a user that an unauthorized viewer is no longer detected is illustrated. When the user triggers the privacy measure 420 (FIG. 4A), the user is notified via prompt 425 that the non-authorized user is no longer detected, as described in step 220 (FIG. 2). The user may select button "TURN PRIVACY MEASURE OFF" 430 or button "CONTINUE USING PRIVACY MEASURE" 435. The user may optionally be required to input credentials 440, such as a username and/or password, to terminate the privacy measure.

Referring now to FIG. 5, a computing system 500 is shown that may be used to implement various embodiments of the present invention. The computing system 500 of FIG. 5 includes one or more processors 505 and memory 510. Main memory 510 stores, in part, instructions and data for execution by processor 505. Main memory 504 can store the executable code when in operation. The system 500 of FIG. 5 further includes a mass storage device 515, portable storage medium drive(s) 520, output devices 525, user input devices 530, a graphics display 535, and peripheral devices 540. The computing system further includes a camera 545 that may be integrated into computing system 500 or attached to computing system 500 as a peripheral device 540, as shown.

The components shown in FIG. 5 are depicted as being connected via a single bus 550. The components, however, may be connected through one or more data transport means. For example, processor unit 505 and main memory 510 may be connected via a local microprocessor bus, and the mass storage device 515, peripheral device(s) 540, portable storage device 520, and display system 535 may be connected via one or more input/output (I/O) buses.

Mass storage device 515, which may be implemented with a magnetic disk drive or an optical disk drive, is a non-volatile storage device for storing data and instructions for use by processor unit 505. Mass storage device 515 may store the system software for implementing embodiments of the present invention for purposes of loading software into main memory 510.

Portable storage device 520 operates in conjunction with a portable nonvolatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 520.

Input devices 530 provide a portion of a user interface. Input devices 530 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 525. Examples of suitable output devices include speakers, printers, network interfaces, and monitors.

Display system 535 may include a liquid crystal display (LCD) or other suitable display device. Display system 535 may receive textual and graphical information, and process the information for output to the display device.

Peripherals 540 may include any type of computer support device to add additional functionality to the computer system. For example, peripheral device(s) 540 may include a modem or a router.

The components contained in the computing system 500 of FIG. 5 are those typically found in computer systems that may be suitable for use with embodiments of the present invention and are intended to represent a broad category of such computer components that are well known in the art. Thus, the computing system 500 of FIG. 5 may be a personal computer, hand held computing device, tablet device, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows Mobile, or iOS. The steps of the methods of FIGS. 1 and 2 (and their various alternatives) may be performed by a module or engine stored on a computer readable storage medium (e.g., optical disc, memory card, etc.) comprising instructions executable by a processor of a computing device.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for display security monitoring, the method comprising:
   storing a user preference in memory regarding at least one of a plurality of different security measures;
   executing a display security monitoring application on a computing device based on the stored user preference;
   calibrating the display security monitoring application to one or more eyes of an authorized viewer designated for the computing device;
   monitoring display security within a viewing range of the computing device by way of a tracking camera associated with the display security monitoring application, wherein the tracking camera:
      tracks a pupil and associated reflected infrared non-collimated light from each of a plurality of eyes detected within a viewing range,
      identifies a set of one or more unauthorized eyes when one or more of the tracked eyes do not correspond to the calibrated eyes of the authorized viewer,
      generates corneal reflections for the identified set of unauthorized eyes based on the respective tracked pupil and associated light, and
      calculates a point of regard on the display for each of the identified set of unauthorized eyes, the point of regard based on the respective generated corneal reflection,
      notifying the authorized viewer that one or more of the unauthorized eyes have been identified;
   automatically executing the at least one security measure associated with the display security monitoring application based on:
      detection of the identified set of unauthorized eyes within the viewing range of the display, or
      detection that no authorized eyes are within the viewing range of the display, wherein the executed security measure blocks at least a portion of the display corresponding to the calculated point of regard for each of the identified set of unauthorized eyes; and
   automatically terminating the at least one executed security measure associated with the display security monitoring application when the one or more unauthorized eyes are no longer detected.

2. The method of claim 1, wherein the plurality of different security measures further includes a screen saver, power down function, or active shutter three-dimensional function.

3. The method of claim 2, wherein the user preference controls which security measure is automatically executed when the unauthorized eyes are detected.

4. A non-transitory computer-readable storage medium having embodied thereon a program, the program being executable by a processor to perform a method for display security monitoring, the method comprising:
   storing a user preference in memory regarding at least one of a plurality of different security measures;
   executing a display security monitoring application on a computing device based on the stored user preference;
   calibrating the display security monitoring application to one or more eyes of an authorized viewer designated for the computing device;
   monitoring display security within a viewing range of the computing device by way of a tracking camera associated with the display security monitoring application, wherein the tracking camera:
      tracks a pupil and associated reflected infrared non-collimated light from each of a plurality of eyes detected within a viewing range,
      identifies a set of one or more unauthorized eyes when one or more of the tracked eyes do not correspond to the calibrated eyes of the authorized viewer,
      generates corneal reflections for the identified set of unauthorized eyes based on the respective tracked pupil and associated light, and
      calculates a point of regard on the display for each of the identified set of unauthorized eyes, the point of regard based on the respective generated corneal reflection,
      notifying the authorized viewer that one or more of the unauthorized eyes have been identified;
   automatically executing the at least one security measure associated with the display security monitoring application based on:
      detection of the identified set of unauthorized eyes within the viewing range of the display, or
      detection that no authorized eyes are within the viewing range of the display, wherein the executed security measure blocks at least a portion of the display corresponding to the calculated point of regard for each of the identified set of unauthorized eyes; and
   automatically terminating the at least one executed security measure associated with the display security monitoring application when the one or more unauthorized eyes are no longer detected.

5. A computing device for display security monitoring, the computing device comprising:
   a display;
   a tracking camera that monitors display security for the display, wherein the tracking camera:
      tracks a pupil and associated reflected infrared non-collimated light from each of a plurality of eyes detected within a viewing range,
      identifies a set of one or more unauthorized eyes when one or more of the tracked eyes do not correspond to the calibrated eyes of the authorized viewer,
      generates corneal reflections for the identified set of unauthorized eyes based on the respective tracked pupil and associated light, and
      calculates a point of regard on the display for each of the identified set of unauthorized eyes, the point of regard based on the respective generated corneal reflection; and
   a display security monitoring application associated with the tracking camera, wherein the display security monitoring application includes a plurality of different security measures, and wherein execution of the application:
      stores a user preference in memory regarding at least one security measures,
      calibrates the display security monitoring application to one or more eyes of the authorized viewer designated for the computing device,
      notifies the authorized viewer that one or more of the unauthorized eyes have been identified,
      automatically executes the at least one security measure associated with the display security monitoring application based on:
         detection of the identified set of unauthorized eyes within the viewing range of the display, or detection that no authorized eyes are within the viewing range of the display, wherein the executed security measure blocks at least a portion of the display corresponding to the calculated point of regard for each of the identified set of unauthorized eyes, and automatically terminates the executed one of the plurality of different security measures associated with the display security monitoring application when the one or more unauthorized eyes are no longer detected.

6. The non-transitory computer-readable storage medium of claim 4, wherein the plurality of different security measures further includes a screen saver, power down function, or active shutter three-dimensional function.

7. The non-transitory computer-readable storage medium of claim 6, wherein the user preference controls which security measure is automatically executed when the unauthorized eyes are detected.

8. The computing device of claim 5, wherein the plurality of different security measures further includes a screen saver, power down function, or active shutter three-dimensional function.

9. The computing device of claim 8, wherein the user preference controls which security measure is automatically executed when the unauthorized eyes are detected.

10. The method of claim 1, further comprising prompting a user on the computing device to initiate the display security monitoring application.

11. The method of claim 1, further comprising receiving the user preference regarding operation of the display security monitoring application, wherein the received user preference includes a selection of one security measures.

12. The non-transitory computer-readable storage medium of claim 4, wherein the program further comprises instruction executable to prompt a user on the computing device to initiate the display security monitoring application.

13. The non-transitory computer-readable storage medium of claim 4, wherein the program further comprises instructions executable to receive the user preference regarding operation of the display security monitoring application, wherein the received user preference includes a selection of one security measures.

14. The computing device of claim 5, wherein the display further prompts a user on the computing device to initiate the display security monitoring application.

15. The computing device of claim 5, wherein the display security monitoring application further receives user preference regarding operation of the display security monitoring application, wherein the received user preference includes a selection of one of the plurality of different security measures.

* * * * *